(12) United States Patent
Boville

(10) Patent No.: US 7,243,400 B2
(45) Date of Patent: Jul. 17, 2007

(54) FIXING CLAMP FOR CONNECTING SHEETS WITH DIFFERENT EXPANSION PROPERTIES

(75) Inventor: Daniel Boville, Paris (FR)

(73) Assignee: A. Raymond & CIE, Grenoble (FR)

( * ) Notice: Subject to any disclaimer, the term of this patent is extended or adjusted under 35 U.S.C. 154(b) by 184 days.

(21) Appl. No.: 10/494,097

(22) PCT Filed: Oct. 16, 2002

(86) PCT No.: PCT/EP02/11539

§ 371 (c)(1),
(2), (4) Date: Mar. 1, 2005

(87) PCT Pub. No.: WO03/038289

PCT Pub. Date: May 8, 2003

(65) Prior Publication Data

US 2005/0144763 A1    Jul. 7, 2005

(30) Foreign Application Priority Data

Oct. 30, 2001   (DE)   ............................ 101 53 569

(51) Int. Cl.
F16B 5/06   (2006.01)
(52) U.S. Cl. ........................................ 24/290; 411/175
(58) Field of Classification Search .......... 24/289–295, 24/297; 296/214; 52/716.7, 718.06, 718.03; 411/508–510, 182, 480, 533, 902, 903, 913, 411/45–48, 349, 173–175, 112; 403/397, 403/408.1

See application file for complete search history.

(56) References Cited

U.S. PATENT DOCUMENTS

| | | | | |
|---|---|---|---|---|
| 2,719,558 A | * | 10/1955 | Tinnerman | .................. 411/173 |
| 4,669,808 A | | 6/1987 | Owen | |
| 5,339,500 A | * | 8/1994 | Muller et al. | .................. 24/514 |
| 5,645,384 A | * | 7/1997 | Wright et al. | ................ 411/174 |
| 6,131,252 A | * | 10/2000 | Hoheisel et al. | .............. 24/514 |

FOREIGN PATENT DOCUMENTS

| | | |
|---|---|---|
| CH | 610386 A | 4/1979 |
| DE | 19633203 | 2/1998 |
| EP | 628733 | 12/1994 |
| EP | 669470 | 8/1995 |
| GB | 2160579 | 12/1985 |

* cited by examiner

*Primary Examiner*—James R. Brittain
(74) *Attorney, Agent, or Firm*—Gifford, Krass, Sprinkle, Anderson & Citkowski, P.C.

(57) ABSTRACT

A fixing clamp for connection of sheets with different expansion properties and is thus installed in a rectangular opening of a support plate. The fixing clamp includes a rectangular baseplate and a threaded sleeve in the center. Transverse webs are bent in the same direction as the threaded sleeve on a front transverse edge. Two clamping legs are bent away from the sleeve, parallel to the baseplate. A further clamping leg is bent upwards on the opposing rear transverse edge in the same direction as the front clamping leg. Spring webs are cut into the baseplate on both sides of the threaded sleeve and bent at an angle in the same direction as the clamping legs. The spring webs are bent with the end regions thereof reaching the baseplate, whereby a separation "A" between the end regions and the transverse webs on the front clamping leg is of such a size that the spring webs extend into the opening when the front clamping legs are situated on the longitudinal edge of the opening.

3 Claims, 1 Drawing Sheet

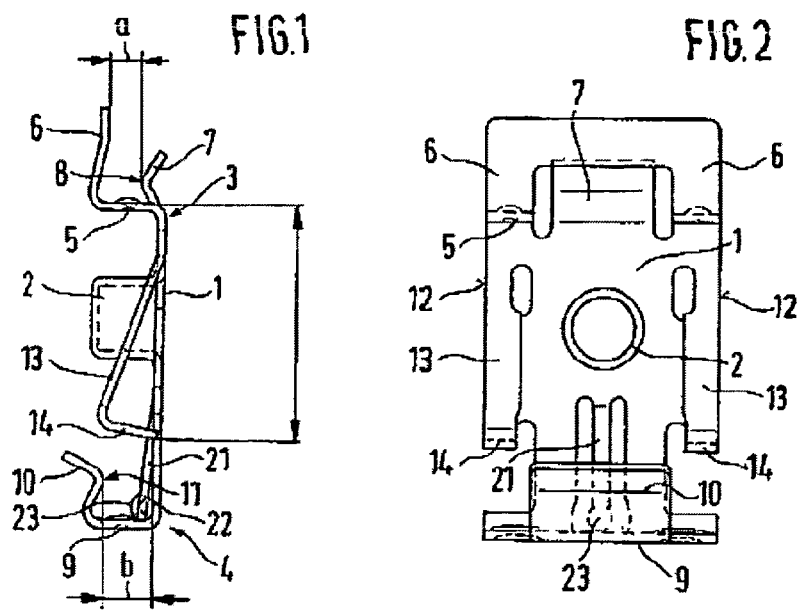
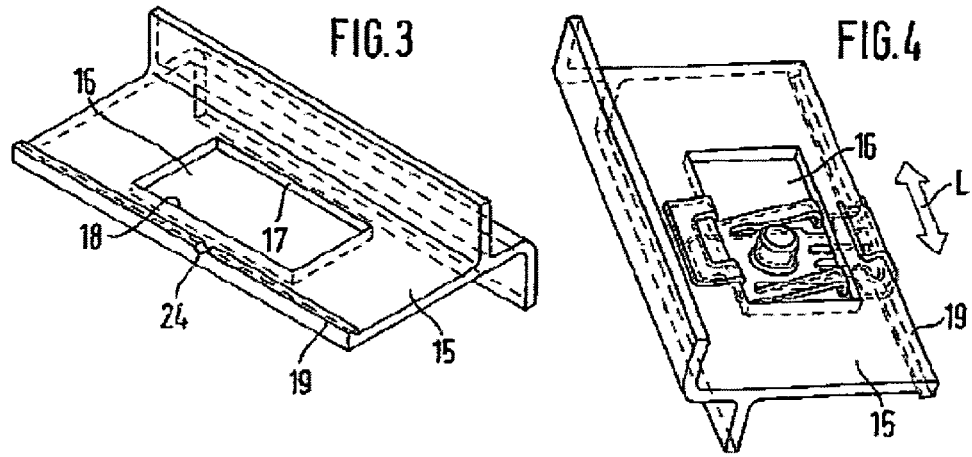
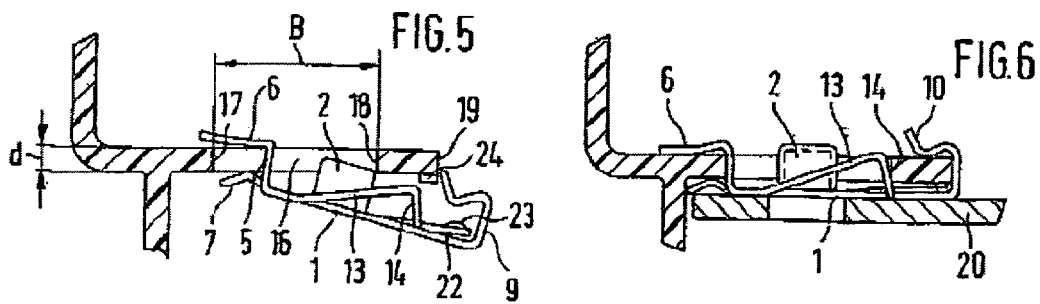

FIXING CLAMP FOR CONNECTING SHEETS WITH DIFFERENT EXPANSION PROPERTIES

BACKGROUND OF THE INVENTION

1. Field of the Invention

The invention pertains to a fixing clamp for connecting sheets with different expansion properties, and more particularly to a support plate having a rectangular opening recessed into the support plate in order to accommodate the fixing clamp such that it can be displaced parallel to the plate edge.

2. Description of Related Art

Fixing clamps of this type are used, for example, in the automobile industry for connecting a fender of plastic to a metallic support plate. Since the plastic fender has a greater coefficient of expansion than the metallic carrier, the mounting element can adapt itself to relative changes in position between the fender and the support plate that are caused by temperature fluctuations, namely because the mounting element is embedded in the oblong hole such that it can be transversely displaced.

Such a fixing clamp of plastic is known from EP 0 799 758 B1. In this case, a base plate that covers the mounting opening is connected to a sliding element that can be inserted into the mounting opening, wherein the sliding element is guided in the opening such that it can be transversely displaced and held in a position of equilibrium by elastic spring elements. The guidance is realized with limbs that are integrally formed onto the longitudinal sides at a spacing that corresponds to the thickness of the fender sheet and that engage behind the edge of the oblong hole. In order to insert the sliding element into the opening, only one limb is integrally formed onto one longitudinal side, wherein this limb can be inserted into a recess of corresponding size in the edge of the opening. When inserting the sliding element, this limb initially needs to be inserted into the recess and then laterally displaced into the mounting position. The fixing clamp that is provided has a through-hole and is subsequently held in this mounting position by elastic spring elements braced on the transverse edges of the rectangular opening.

This fixing clamp may be unsuitable in certain applications, since the limb of the sliding element to be inserted can be displaced in the recess on the edge of the rectangular opening, depending on the temperature-related compensation movement. As a result, the sliding element may fall out of the opening. The elasticity of the elastic spring elements that are integrally formed onto the lateral edges may also diminish over time such that the clamp is no longer automatically held in the intended position with the subassembly and the completion of the connection becomes more difficult.

Thus, there is a need in the art for a fixing clamp that can be easily inserted into the mounting opening and reliably held therein during all lateral displacements.

SUMMARY OF THE INVENTION

According to the invention, a fixing clamp is disclosed. An advantage of the present invention is that it is possible to shape the clamp from a steel sheet billet with simple means and to simultaneously provide the clamp with a threaded sleeve. Another advantage of the present invention is that it eliminates a need for a special nut with the fixing clamps.

Another advantage of the present invention is that the insertion of the fixing clamp into the rectangular opening of the support plate can be easily realized. For this purpose, the clamp is inserted into the opening with its front limb pointing forward, namely, to such a degree that the elevated limb engages behind the edge of the opening and the threaded sleeve moves past the opposite edge of the opening. The clamp is now pressed upward until the rear limb lies in front of the plate edge. The clamp is then displaced until the spring limbs that were previously pressed down spring upward with their ends on the rear edge of the opening and thusly secure the fixing clamp in the installed position.

With respect to the transversely displaceable design of the clamp, it is appropriate if the upwardly bent spring webs are angled in opposite directions on their ends.

Since the rear clamping limbs are spaced apart from the base plate by such a distance that they can be easily pressed on over the plate edge, it is advantageous, according to another characteristic of the invention. The fixing clamp may include an additional spring limb formed between the threaded sleeve and the rear clamping limb and includes a hemispherically shaped projection. A corresponding depression in the plate edge of the support plate may receive the spherical projection, such that the spherical projection is able to snap into the depression in the predetermined installation position of the fixing clamp.

BRIEF DESCRIPTION OF THE DRAWINGS

Advantages of the present invention will be readily appreciated as the same becomes better understood by reference to the following detailed description when considered in connection with the accompanying drawings, wherein:

FIG. 1, a side view of the fixing clamp;

FIG. 2, a top view of the same clamp;

FIG. 3, a perspective representation of a support plate with the rectangular opening viewed from the bottom;

FIG. 4, a perspective representation of the fixing clamp inserted into the opening in the support plate viewed from the top;

FIG. 5, the installation of the clamp into the rectangular opening of the sectionally illustrated support plate; and FIG. 6, the same support plate with installed fixing clamp and a second sheet to be connected with the clamp.

DETAILED DESCRIPTION OF THE INVENTION

The fixing clamp illustrated in FIGS. 1-6 is used to connect sheets 15, 20 with different expansion properties, by utilizing a screw. One sheet is a support plate 15 having a rectangular opening 16. The second sheet 20 is connected to the support plate 15 using a screw. The clamp consists of a rectangular base plate 1 of spring steel that is provided with a centrally arranged threaded sleeve 2 for receiving a screw. On the front transverse edge 3 of the base plate 1 which is illustrated in the upper portion of FIG. 1, two transverse webs 5 are bent upward in the same direction as the threaded sleeve 2. Two front clamping limbs 6 are bent away from the sleeve 2 parallel to the base plate 1. A counter limb 7 is integrally formed onto the transverse edge 3 between the two front clamping limbs 6. This counter limb 7 is slightly bent initially toward the front clamping limbs 6 over a short section and then slightly bent back again. The distance "a" between the bend 8 and the opposing clamping limbs 6 is approximately identical to the thickness "d" of the support plate 15 (see FIG. 5).

Another rear clamping limb 10, that points in the same direction as the front clamping limbs 6, is bent upward on the rear transverse edge 4 of the base plate 1 via an angled transverse wall 9. The front clamping limb 10 initially is slightly bent toward the base plate 1 over a short section 10' and then steeply bent only from the base plate over a second section 10". The distance "b" between the bend 11 and the base plate 1 is slightly larger than the distance "a" on the front clamping limbs 6 in this case.

Spring webs 13 are cut out of the base plate 1 at both sides of the threaded sleeve 2 along the longitudinal edges 12. The spring webs are obliquely bent upwards in the direction of the rear clamping limbs 10, and the end region 14 is bent downward about vertically to the top of the base plate 1. In this case, it needs to be observed that a distance "A" between the ends 14 of the spring webs 13 and the transverse webs 5 of the front clamping limbs 6 is equal to or slightly smaller than the clear distance "B" between the two longitudinal edges 17 and 18 of the rectangular opening 16 of the support plate (see FIG. 5).

When installing the fixing clamp into the rectangular opening 16 in the support plate, the clamp initially is obliquely inserted into the opening 16 from the bottom with the front clamping limbs 6 pointing forward as shown in FIG. 5. The clamping limbs 6 are directed beyond the longitudinal edge 17 of the opening 16 and the counter limb 7 is directed underneath the longitudinal edge 17. The clamp is then inserted into the opening 16 in the support plate until the threaded sleeve 2 moves past the rear longitudinal edge 18 of the opening 16 and the rear clamping limb 10 is still situated in front of the outer plate edge 19. The rear of the clamp is then pressed upward against the force of the spring webs 13 until the rear clamping limb 10 can be displaced over the plate edge 19. As soon as the front transverse web 5 adjoins the longitudinal edge 17 and the rear transverse wall 9 adjoins the plate edge 19, the spring webs 13 that were previously pressed down spring back into their original position. The angled end 14 of the spring webs 13 adjoins the rear longitudinal edge 18 of the support plate in such a way that the clamp is guided in the opening 16 between the two longitudinal edges 17 and 18 of the support plate, such that it can be longitudinally displaced as indicated by the double arrow "L" (see FIG. 4).

In order to compensate for the play of the rear plate edge 19 between the rear clamping limb 10 and the base plate 1, an additional spring web 21 is punched out of the center of the base plate 1 between the threaded sleeve 2 and the rear clamping limb 10. This additional spring web is slightly bent upward in the same direction as the rear clamping limb 10. On its free springable end 22, an approximately hemispherically shaped spherical projection 23 is formed in the direction of the clamping limb 10. This spring web 21 holds the clamp on the plate edge 19, and prevents play in the region of the rear clamping limb 10.

A corresponding depression 24 may be formed in the plate edge 19, and positioned in the predetermined installation position of the clamp as shown in FIG. 3. The spherical projection 23 is able to elastically snap into this depression such that the clamp is positively held in this position.

However, the spherical projection 23 is able to snap out of the depression 24, and the fixing clamp is able to yield in the direction of the arrow "L" if expansion forces become effective.

The invention has been described in an illustrative manner. It is, therefore, to be understood that the terminology used in intended to be in the nature of words of description rather than of limitation. Many modifications and variations of the invention are possible in light of the above teachings. Thus, within the scope of the appended claims, the invention may be practiced other than as specifically described.

I claim:

1. A fixing clamp for connecting a sheet having an expansion property with a support plate having a different expansion property, such that the support plate includes an outer edge and a rectangular opening having a front longitudinal edge and an opposed rear longitudinal edge that receives the fixing clamp, and the fixing clamp is displaceable parallel to the edge of the support plate, the fixing clamp comprising:

a rectangular base plate of spring steel having an upper surface and lower surface, and a front transverse edge and an opposed rear transverse edge;

a threaded sleeve in the center of the base plate;

a pair of clamping limbs integrally formed along both front and rear transverse edges of the base plate, and pointing in the same direction, wherein the front clamping limb on the front transverse edge can be inserted through the opening in the support plate and is clamped in position on a longitudinal edge of the opening in the support plate, and the rear clamping limb on the rear transverse edge can simultaneously be clamped in position on the support plate outer edge; and a pair of spring webs formed in the base plate on both sides of the threaded sleeve, wherein the spring webs are obliquely bent upward in the same direction as the clamping limb, and an end of the spring web is bent downwardly towards the upper surface of the base plate, wherein a distance "A" between the end of the spring web and a transverse leg of the front clamping limb is equal to or less than a distance "B" between the front and rear longitudinal edges of the rectangular opening.

2. A fixing clamp as set forth in claim 1, further comprising an additional spring limb formed in a middle portion of a base plate between the threaded sleeve and the rear clamping limb, wherein the additional spring limb is bent upwardly towards the rear clamping limb and has a hemispherically shaped projection formed on a free springable end of the additional spring limb in the direction of the rear clamping limb.

3. A fixing clamp as set forth in claim 2, further comprising a depression formed in the plate edge for receiving the hemi-spherical projection, wherein the spherical projection snaps into the depression to maintain the fixing clamp in a predetermined installation position.

\* \* \* \* \*